Figure 1:
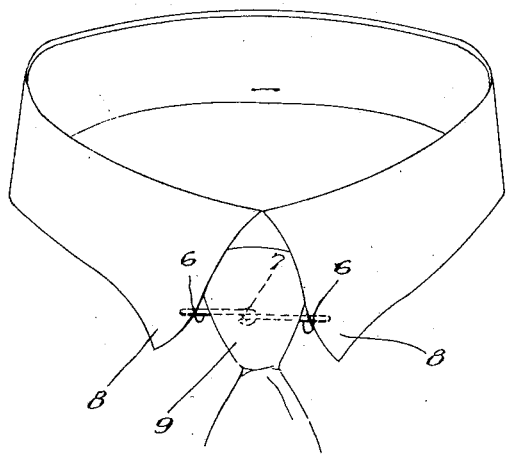

R. W. JOHNSON.
COLLAR LINK.
APPLICATION FILED FEB. 4, 1921.

1,396,041.

Patented Nov. 8, 1921.

Inventor:
Robert W. Johnson

By

Attorneys.

UNITED STATES PATENT OFFICE.

ROBERT W. JOHNSON, OF CHICAGO, ILLINOIS.

COLLAR-LINK.

1,396,041.   Specification of Letters Patent.   Patented Nov. 8, 1921.

Application filed February 4, 1921. Serial No. 442,462.

*To all whom it may concern:*

Be it known that I, ROBERT W. JOHNSON, a citizen of the United States, residing at Chicago, in the county of Cook and State of Illinois, have invented new and useful Improvements in Collar-Links, of which the following is a specification.

This invention relates to devices applicable to turn-down collars of the soft or negligée type for the purpose of holding the front flaps thereof in proper position with respect to a necktie or scarf.

The invention has for its object to provide a very simple and efficient holder of the kind stated, and also one which can be easily and quickly applied to and removed from the collar.

The object stated is attained by means of a novel combination and arrangement of parts to be hereinafter described and claimed, and in order that the same may be better understood, reference is had to the accompanying drawing forming a part of this specification.

Figure 2:
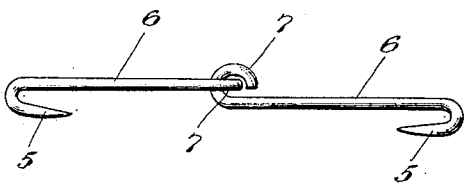

In the drawing,

Figure 1 is an elevation of the device in place on a collar, and Fig. 2 is an enlarged elevation of the device attached.

Referring specifically to the drawing, the device comprises two sharp hooks 5 each of which is at the outer end of a shank 6. The two shanks are loosely linked together at their inner ends by being here formed with interlocking eyes 7. The hooks 5 extend rearwardly from the shanks 6, and hence they point toward each other.

In use, the device is placed beneath the front flaps 8 of the collar, one hook being caught in one flap and the other hook in the opposite flap. The device now extends transversely between the opposite side edges of the flap, and it crosses the knot 9 of the scarf to the rear thereof, thereby holding the flaps properly positioned with respect to the scarf. As the device is in two loosely connected sections, it can be readily applied and removed, and by engaging the hooks farther back or closer to the opposite side edges of the collar flaps, the latter can be drawn together as much as desired.

I claim:

A device of the character described, comprising a pair of hooks having shanks which are provided at their inner ends with interlocking eyes which loosely link the shanks together, the bills of the hooks being at the outer ends of the shanks and extending rearwardly therefrom.

In testimony whereof I affix my signature.

ROBERT W. JOHNSON.